(12) United States Patent
Naraki

(10) Patent No.: US 10,046,316 B2
(45) Date of Patent: Aug. 14, 2018

(54) ZEOLITE

(71) Applicant: TOSOH CORPORATION, Yamaguchi (JP)

(72) Inventor: Yusuke Naraki, Yamaguchi (JP)

(73) Assignee: TOSOH CORPORATION, Yamaguchi (JP)

( * ) Notice: Subject to any disclaimer, the term of this patent is extended or adjusted under 35 U.S.C. 154(b) by 0 days.

(21) Appl. No.: 15/545,055

(22) PCT Filed: Feb. 4, 2016

(86) PCT No.: PCT/JP2016/053333
§ 371 (c)(1),
(2) Date: Jul. 20, 2017

(87) PCT Pub. No.: WO2016/125850
PCT Pub. Date: Aug. 11, 2016

(65) Prior Publication Data
US 2017/0348679 A1 Dec. 7, 2017

(30) Foreign Application Priority Data

Feb. 5, 2015 (JP) ................................. 2015-020805

(51) Int. Cl.
| | | |
|---|---|---|
| C01B 39/48 | (2006.01) | |
| B01J 29/76 | (2006.01) | |
| B01D 53/94 | (2006.01) | |
| C01B 39/02 | (2006.01) | |
| B01J 29/70 | (2006.01) | |
| B01J 35/02 | (2006.01) | |
| B01J 37/10 | (2006.01) | |
| B01J 37/00 | (2006.01) | |
| B01J 37/30 | (2006.01) | |

(52) U.S. Cl.
CPC .......... *B01J 29/76* (2013.01); *B01D 53/9418* (2013.01); *B01J 29/70* (2013.01); *B01J 35/026* (2013.01); *B01J 37/0018* (2013.01); *B01J 37/10* (2013.01); *B01J 37/30* (2013.01); *C01B 39/026* (2013.01); *C01B 39/48* (2013.01); *B01D 2255/50* (2013.01); *B01J 2229/183* (2013.01); *C01P 2002/76* (2013.01); *C01P 2004/42* (2013.01); *C01P 2006/37* (2013.01)

(58) Field of Classification Search
CPC .. C01B 39/48; C01P 2002/72; C01P 2004/42; B01D 53/9418; B01J 29/70; B01J 29/76
See application file for complete search history.

(56) References Cited

U.S. PATENT DOCUMENTS

| | | | | | |
|---|---|---|---|---|---|
| 4,508,837 | A | * | 4/1985 | Zones | ..................... B01J 29/04 423/326 |
| 4,589,976 | A | * | 5/1986 | Zones | ..................... B01J 29/04 208/111.01 |
| 5,194,235 | A | * | 3/1993 | Zones | ..................... C01B 39/48 423/704 |
| 8,562,942 | B2 | * | 10/2013 | Archer | ................... C01B 37/007 423/706 |
| 9,868,643 | B2 | * | 1/2018 | Elomari | ................... C01B 39/48 |
| 9,908,108 | B2 | * | 3/2018 | Davis | ....................... B01J 29/70 |
| 2008/0241060 | A1 | | 10/2008 | Li | |
| 2010/0092361 | A1 | | 4/2010 | Li | |
| 2010/0092362 | A1 | | 4/2010 | Li | |
| 2010/0260665 | A1 | | 10/2010 | Archer et al. | |
| 2014/0093448 | A1 | | 4/2014 | Archer et al. | |
| 2016/0096169 | A1 | * | 4/2016 | Rivas-Cardona | ..... C01B 39/026 423/700 |
| 2017/0348675 | A1 | * | 12/2017 | Faure | ..................... B01J 23/005 |

FOREIGN PATENT DOCUMENTS

| | | |
|---|---|---|
| JP | 2010-522688 | 7/2010 |
| JP | 2012-523367 | 10/2012 |
| JP | 2014-148441 | 8/2014 |
| WO | 2008/118434 | 10/2008 |
| WO | 2010/118377 | 10/2010 |

OTHER PUBLICATIONS

Raymond H. Archer et al., "Imidazolium struture directing agents in zeolite synthesis: Exploring quest/host relationships in the synthesis of SSZ-70", Microporous and Mesoporus Materials, 130, 2010, pp. 255-265.

Dustin W. Finkel et al., "Copper Coordination in Cu-SSZ-13 and Cu-SSZ-16 Investigated by Variable-Temperature XRD", J. Phys. Chem. C., 114, 2010, pp. 1633-1640.

Yashodhan Bhawe et al., "Effect of Cage size on the Selective Conversion of Methanol to Light Olefins", ACS Catalysis 2, 2012, pp. 2490-2495.

Raul F. Lobo et al., "Synthesis and Rietveld Refinement of the Small-Pore Zeolite SSZ-16", Chem. Mater, 8, 1996, pp. 2409-2411.

Dustin W. Finkel et al., "The ammonia selective catalytic reduction activity of copper-exchanged small-pore zeolites", Applied Catalysis B: Environmental, 102, 2011, pp. 441-448.

International Search Report issued in WIPO Patent Application No. PCT/JP2016/053333, dated Mar. 8, 2016.

* cited by examiner

*Primary Examiner* — David M Brunsman

(74) *Attorney, Agent, or Firm* — Greenblum & Bernstein, P.L.C.

(57) ABSTRACT

An object of the present invention is to provide an AFX zeolite having a novel structure. An AFX zeolite having a lattice spacing d of a (004) plane being not less than 4.84 Å and not greater than 5.00 Å, and a molar ratio of silica to alumina being not less than 10 and not higher than 32. Such an AFX zeolite can be produced by a production method comprising a crystallization step of crystallizing a composition at a temperature of not lower than 160° C.; the composition containing a silicon source, an aluminum source, a 1,3-di(1-adamantyl)imidazolium cation, and an alkali metal; a molar ratio of hydroxide ions to silica being less than 0.25 or a molar ratio of silica to alumina being not higher than 27; and a molar ratio of the 1,3-di(1-adamantyl) imidazolium cation to silica being less than 0.20.

13 Claims, 4 Drawing Sheets

ZEOLITE

TECHNICAL FIELD

The present invention relates to an AFX zeolite having a novel crystal structure. The present invention further relates to a highly heat resistant zeolite having an AFX structure, and a catalyst containing the same.

BACKGROUND ART

An AFX zeolite is a small-pore zeolite having 8-membered oxygen rings. This is used as a catalyst exhibiting high activity in an MTO (methanol to olefins) reaction. In recent years, AFX zeolites have been highly anticipated as zeolites suitable for a catalyst used in selective catalytic reduction (referred to as "SCR" hereafter), wherein nitrogen oxides are reduced and detoxified. Such a catalyst is referred to as "SCR catalyst" hereinafter.

Incidentally, zeolite is difficult to predict and design, and it is not possible to predict the structure or physical properties of a zeolite to be obtained from the raw materials or synthesis conditions. Therefore, in order to obtain a target zeolite, it is necessary to actually synthesize the zeolite. The synthesis conditions of an AFX zeolite are also unpredictable, and the following are production methods for AFX zeolites that have been reported in the past.

For example, in Patent Document 1, an AFX zeolite obtained by using a quinuclidine derivative as an organic structure directing agent (referred to as "SDA" hereafter) is disclosed as SSZ-16.

Types of SSZ-16 obtained using different SDAs and raw materials than those described in Patent Document 1 have been disclosed by multiple inventors (Patent Documents 2 and 3, Non-Patent Documents 1 to 4).

In Non-Patent Document 1, SSZ-16 having an $SiO_2/Al_2O_3$ ratio of 9 is disclosed. This disclosed SSZ-16 is a crystal having many defects and does not have a good particle shape. In addition, in Non-Patent Document 2, an SCR reaction using a copper ion-exchanged substance obtained by ion-exchanging SSZ-16 having an $SiO_2/Al_2O_3$ ratio of 9 with copper is investigated. It is disclosed that this SSZ-16 has good initial activity and has high durability with respect to treatment at temperatures with a relatively small thermal load, that is, in a hydrothermal atmosphere at 750° C.

In Patent Document 3 and Non-Patent Documents 3 and 4, SSZ-16 having a high $SiO_2/Al_2O_3$ ratio is disclosed.

In Non-Patent Document 3, SSZ-16 having an $SiO_2/Al_2O_3$ ratio of 33.4 is disclosed. On the other hand, it is disclosed that an AFX zeolite that has an $SiO_2/Al_2O_3$ ratio other than 33.4 cannot be obtained. In addition, in Non-Patent Document 4, it is disclosed that an AFX zeolite is obtained only when a Y-type zeolite is used as a raw material.

CITATION LIST

Patent Literature

Patent Document 1: U.S. Pat. No. 4,508,837
Patent Document 2: U.S. Pat. No. 5,194,235
Patent Document 3: WO 2010/118377A2

Non-Patent Literature

Non-Patent Document 1: The Journal of Physical Chemistry C 114 (2010) 1633-1640

Non-Patent Document 2: Applied Catalysis B: Environmental 102 (2011) 441-448
Non-Patent Document 3: ACS Catalysis 2 (2012) 2490-2495
Non-Patent Document 4: Microporous and Mesoporous Materials 130 (2010) 255-265

SUMMARY OF INVENTION

Technical Problem

An object of the present invention is to provide an AFX zeolite having a novel structure. Another object of the present invention is to provide an AFX zeolite having high durability with respect to hydrothermal durability treatment at 800° C. or higher (also referred to as "high-temperature hydrothermal durability treatment" hereafter). Yet another object of the present invention is to provide an AFX zeolite exhibiting minimal decreases in nitrogen oxide reduction characteristics after such hydrothermal durability treatment and having high nitrogen oxide reduction characteristics over a wide temperature range from low temperatures to high temperatures even after such treatment, and a production method thereof. Yet another object of the present invention is to provide an AFX zeolite containing a transition metal, exhibiting minimal decreases in nitrogen oxide reduction characteristics after hydrothermal durability treatment at 800° C. or higher, and having high nitrogen oxide reduction characteristics over a wide temperature range from low temperatures to high temperatures even after such treatment.

Solution to Problem

The present inventor investigated AFX zeolites having excellent heat resistance and further investigated AFX zeolites having excellent high-temperature hydrothermal durability. As a result, the present inventor discovered an AFX zeolite having a specific crystal structure. The present inventor further discovered that such an AFX zeolite has excellent heat resistance and that degradation is suppressed even when exposed to a hot water atmosphere at 800° C. or higher, in particular. The present inventor further discovered that when the AFX zeolite contains a transition metal, the AFX exhibits minimal decreases in nitrogen oxide reduction characteristics even when exposed to a high-temperature hot water atmosphere, and that the AFX zeolite has high nitrogen oxide reduction characteristics over a wide temperature range from low temperatures to high temperatures. The present inventor thereby completed the present invention.

That is, the gist of the present invention is as follows.

[1] An AFX zeolite having a lattice spacing d of a (004) plane being not less than 4.84 Å and not greater than 5.00 Å, and a molar ratio of silica to alumina thereof being not less than 10 and not higher than 32.

[2] The AFX zeolite according to [1] above, wherein the lattice spacing d of the (004) plane is not less than 4.925 Å and not greater than 5.00 Å.

[3] The AFX zeolite according to [1] or [2] above, wherein the molar ratio of silica to alumina is not less than 10 and not higher than 30.

[4] The AFX zeolite according to any one of [1] to [3] above having a lattice spacing d according to the following table:

TABLE 1

| Lattice spacing d [Å] |
|---|
| 11.81 ± 0.13 |
| 10.13 ± 0.08 |
| 7.59 ± 0.08 |
| 6.80 ± 0.06 |
| 4.96 ± 0.035 |
| 4.34 ± 0.02 |
| 4.06 ± 0.02 |

[5] The AFX zeolite according to any one of [1] to [4] above containing primary particles having a hexagonal bipyramids shape.

[6] The AFX zeolite according to any one of [1] to [5] above containing crystal particles including primary particles aggregated by chemical bonds.

[7] The AFX zeolite according to any one of [1] to [6] above containing one or more types of transition metals selected from the group consisting of groups 8, 9, 10, and 11 of the periodic table.

[8] A production method for the AFX zeolite according to any one of [1] to [7] above, the method comprising a crystallization step of crystallizing a composition at a temperature of not lower than 160° C.; the composition containing a silicon source, an aluminum source, a 1,3-di(1-adamantyl)imidazolium cation, and an alkali metal; a molar ratio of hydroxide ions to silica being less than 0.25 or a molar ratio of silica to alumina being not higher than 27; and a molar ratio of the 1,3-di(1-adamantyl)imidazolium cation to silica being less than 0.20.

[9] The production method according to [8] above, wherein the composition contains at least one type selected from the group consisting of 1,3-di(1-adamantyl)imidazolium hydroxide, 1,3-di(1-adamantyl)imidazolium bromide, 1,3-di(1-adamantyl)imidazolium chloride, and 1,3-di(1-adamantyl)imidazolium iodide.

[10] The production method according to [8] or [9] above, wherein the composition has the following composition:
$SiO_2/Al_2O_3$ of not less than 10 and less than 100;
$OH/SiO_2$ of not less than 0.06 and less than 0.25;
Alkali metal/$SiO_2$ of not less than 0.06 and less than 0.25;
1,3-Di(1-adamantyl)imidazolium cation/$SiO_2$ of not less than 0.02 and less than 0.20; and
$H_2O/SiO_2$ of not less than 5 and less than 60.

[11] The production method according to [8] or [9] above, wherein the composition has the following composition:
$SiO_2/Al_2O_3$ of not less than 10 and not more than 25;
$OH/SiO_2$ of not less than 0.25 and less than 0.40;
Alkali metal/$SiO_2$ of not less than 0.25 and less than 0.40;
1,3-Di(1-adamantyl)imidazolium cation/$SiO_2$ of not less than 0.02 and less than 0.20; and
$H_2O/SiO_2$ of not less than 5 and less than 60.

[12] A catalyst containing the AFX zeolite according to any one of [1] to [7] above.

[13] A reduction and removal method for nitrogen oxides using the AFX zeolite according to any one of [1] to [7] above.

Advantageous Effects of Invention

Since the AFX zeolite of the present invention has excellent heat resistance, it exhibits minimal decreases in nitrogen oxide reduction characteristics after hydrothermal durability treatment at 800° C. or higher and has high nitrogen oxide reduction characteristics over a wide temperature range from low temperatures to high temperatures even after such treatment. Therefore, the AFX zeolite can be used as a nitrogen oxide reduction catalyst.

DESCRIPTION OF EMBODIMENTS

Figure 1:
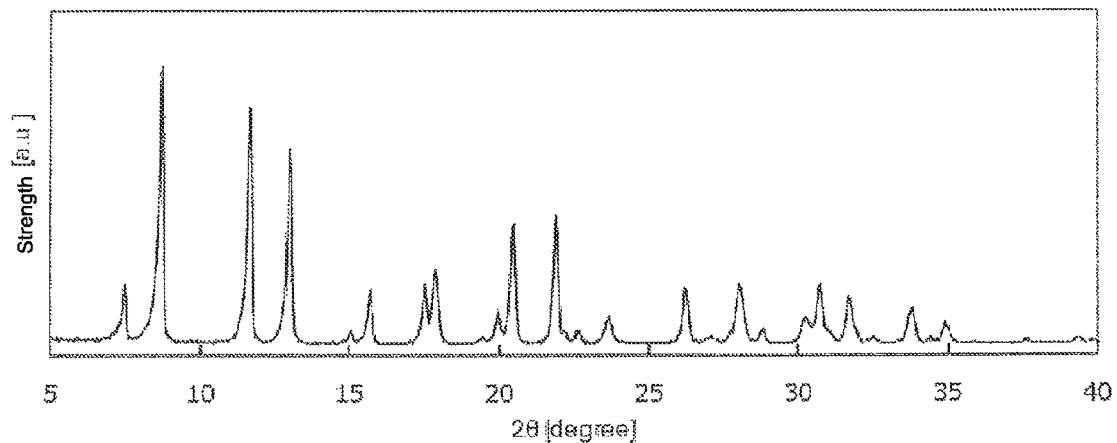
FIG. 1 is an XRD pattern of an AFX zeolite of Example 1.

The AFX zeolite of the present invention will be described hereinafter.

The present invention relates to an AFX zeolite. An AFX zeolite is a zeolite having an AFX structure and, more particularly, is an aluminosilicate having an AFX structure.

An aluminosilicate contains a structure comprising a network of repeating units of aluminum (Al) and silicon (Si) mediated by oxygen (O) (referred to as "network structure" hereafter) and contains a silanol group (Si—OH) in the framework thereof at the ends, such as terminals of the network structure or defects or the like (referred to as "framework ends" hereafter).

An AFX structure is a structure classified as an AFX-type topology according to the IUPAC structure code prescribed by the Structure Commission of the International Zeolite Association (referred to as "IZA" hereafter).

According to the AFX zeolite of the present invention, the lattice spacing d of the (004) plane (also referred to as "$d_{(004)}$" hereafter) is not less than 4.84 Å. $d_{(004)}$ is an index indicating the length along the c-axis (referred to as the "c-axis length" hereafter) of a unit cell of a crystal of the AFX zeolite. For example, the SSZ-16 disclosed in Patent Document 1 and the like has a $d_{(004)}$ value of 4.83 Å, which means that the c-axis length of this SSZ-16 is shorter than the c-axis length of the AFX zeolite of the present invention. Having a larger $d_{(004)}$ than that of a conventional SSZ-16 is thought to increase the durability of the AFX zeolite of the present invention with respect to degradation after exposure to a hydrothermal atmosphere (also referred to as "hydrothermal durability" hereafter).

The lower limit of the value of $d_{(004)}$ of the AFX zeolite of the present invention may be 4.84 Å, 4.88 Å, 4.90 Å, or 4.925 Å. Such a value of $d_{(004)}$ yields an increase in high-temperature hydrothermal durability. On the other hand, the upper limit of $d_{(004)}$ may be 5.00 Å, 4.99 Å, 4.98 Å, or 4.97 Å. A range of $d_{(004)}$ is preferably not less than 4.90 Å and not greater than 4.98 Å, more preferably not less than 4.92 Å and not greater than 4.98 Å, and further more preferably not less than 4.925 Å and not greater than 4.98 Å.

When an AFX zeolite contains an SDA, the crystal lattice becomes large, and the c-axis length becomes long. As a result, an AFX zeolite containing an SDA tends to have a larger $d_{(004)}$ than an AFX zeolite not containing an SDA. In contrast, the $d_{(004)}$ of the AFX zeolite of the present invention is not less than 4.84 Å whether in a state containing an SDA or a state not containing an SDA. The AFX zeolite more preferably has a $d_{(004)}$ value of not less than 4.84 Å in a state not containing an SDA and has a $d_{(004)}$ value within the range described above. An example of a state not containing an SDA is a state in which the quaternary ammonium cation content is not greater than 0.1 wt. %, preferably the quaternary ammonium cation content is not greater than the detection limit.

$d_{(004)}$ is the lattice spacing which corresponds to the c-axis length, and this can be determined by powder X-ray diffraction (referred to as "XRD" hereafter) measurement. The following conditions may be used as XRD measurement conditions.

Radiation source: CuKα radiation (λ=1.5405 Å)

Measurement mode: step scan

Scanning condition: 0.01/sec

Divergence slit: 1.00 deg

Scattering slit: 1.00 deg

Receiving slit: 0.30 mm

Measurement time: 1.00 sec

Measurement range: 2θ=3.0° to 43.0°

It is disclosed in Patent Document 1 that the $d_{(004)}$ of an SSZ-16 from which an SDA has been removed by calcination is 4.83 Å. The AFX zeolite of the present invention and SSZ-16 are both zeolites having an AFX structure, so both have similar XRD patterns. Therefore, the AFX zeolite of the present invention may have an XRD pattern having peaks each corresponding to a lattice spacing d similar to a lattice spacing of SSZ-16 except for the peak corresponding to $d_{(004)}$. However, the XRD pattern of the AFX zeolite of the present invention differs from the XRD pattern of SSZ-16 at least in that $d_{(004)}$ is not less than 4.84 Å, and in that $d_{(004)}$ is 4.96±0.035 Å.

The AFX zeolite of the present invention preferably has the lattice spacing d according to the following table.

TABLE 2

| Lattice spacing d [Å] |
| --- |
| 11.81 ± 0.13 |
| 10.13 ± 0.08 |
| 7.59 ± 0.08 |
| 6.80 ± 0.06 |
| 4.96 ± 0.035 |
| 4.34 ± 0.02 |
| 4.06 ± 0.02 |

Having such a crystal structure gives the AFX zeolite of the present invention superior heat resistance and high-temperature hydrothermal durability. In the above table, it is preferable for the lattice spacing d=4.96±0.035 corresponding to $d_{(004)}$ to be d=4.96±0.03 and more preferably d=4.96±0.02.

The AFX zeolite of the present invention preferably has the lattice spacings d and XRD peak intensity ratios according to the following table. The heat resistance is enhanced as a result of having such peak intensity ratios.

TABLE 3

| Lattice spacing d [Å] | Powder X-ray diffraction peak intensity ratio |
| --- | --- |
| 11.81 ± 0.13 | Weak |
| 10.13 ± 0.08 | Strong-very strong |
| 7.59 ± 0.08 | Strong-very strong |
| 6.80 ± 0.06 | Moderate-strong |
| 4.96 ± 0.035 | Weak-moderate |
| 4.34 ± 0.02 | Moderate-strong |
| 4.06 ± 0.02 | Moderate-very strong |

Here, the relationship between the XRD peak intensity ratio of the table above and the numerical value of an XRD peak expressed by $I/I_0 \times 100$ in an actual XRD pattern is as illustrated in the table below. In Table 3 above, it is preferable for the lattice spacing d=4.96±0.035 corresponding to $d_{(004)}$ to be d=4.96±0.03 and more preferably d=4.96±0.02. Where, I and $I_0$ are as follows.

I: XRD peak intensity at each lattice spacing d $I_0$: XRD peak intensity having the maximum XRD peak intensity in the XRD pattern

TABLE 4

| XRD peak intensity ratio | $I/I_0 \times 100$ |
| --- | --- |
| Very weak | Not less than 1 and less than 10 |
| Weak | Not less than 10 and less than 30 |
| Moderate | Not less than 30 and less than 70 |
| Strong | Not less than 70 and less than 90 |
| Very strong | Not less than 90 and not greater than 100 |

A higher molar ratio of silica to alumina (also referred to as "$SiO_2/Al_2O_3$" hereafter) in the AFX zeolite enhances heat resistance and yields hydrophobicity. The high-temperature hydrothermal durability becomes particularly high when the $SiO_2/Al_2O_3$ of the AFX zeolite of the present invention is not less than 10. The $SiO_2/Al_2O_3$ is preferably not less than 11, more preferably not less than 12, even more preferably not less than 13, even more preferably not less than 15, even more preferably not less than 16, and even more preferably not less than 19. The $SiO_2/Al_2O_3$ is preferably not higher than 32, more preferably not higher than 31, even more preferably not higher than 30, even more preferably not higher than 28, and even more preferably not higher than 27 in that the amount of solid acid becomes large, the catalytic activity is enhanced, and the composition becomes hydrophilic.

Since the AFX zeolite of the present invention has the $d_{(004)}$ and $SiO_2/Al_2O_3$ described above, the hydrothermal durability, the high-temperature hydrothermal durability, in particular, is increased, which yields an AFX zeolite which is particularly suited for a catalyst, a catalyst support, or the like. The $SiO_2/Al_2O_3$ is preferably not less than 12 and not higher than 32 and particularly preferably not less than 12 and not higher than 30 in order to yield a catalyst which exhibits a high nitrogen oxide reduction rate. When the $SiO_2/Al_2O_3$ is not higher than 32, the AFX zeolite has excellent catalytic properties and can be easily used industrially. An AFX zeolite having an $SiO_2/Al_2O_3$ exceeding 32, such as an AFX zeolite having an $SiO_2/Al_2O_3$ greater than 32 and not higher than 44.5, for example, can also be used as a catalyst or an adsorbent. However, since a zeolite having a high $SiO_2/Al_2O_3$ has a small ion exchange capacity, it is unnecessary to set the $SiO_2/Al_2O_3$ of the AFX zeolite to be higher than 32 when it is to be used as a nitrogen oxide reduction catalyst, for example.

The AFX zeolite of the present invention includes primary particles having a hexagonal bipyramids shape. Further, the primary particles of the AFX zeolite of the present invention preferably have a hexagonal bipyramids shape. The primary particles having a hexagonal bipyramids shape are crystal particles of an AFX zeolite the crystal plane of which has grown favorably. By detecting that the primary particles have a hexagonal bipyramids shape, it can be confirmed that the crystal plane of the AFX zeolite of the present invention has grown favorably. Due to such crystal particles of the AFX zeolite, there are few crystal defects, and the heat resistance or high-temperature hydrothermal durability is enhanced.

Where, the primary particles of the present invention are particles of a polycrystalline particles formed by the aggregation of single crystals. The primary particles of the AFX zeolite of the present invention are the smallest units of particles observed in scanning electron microscopy (also referred to as "SEM" hereafter) observations.

The primary particles of the AFX zeolite of the present invention may be independent crystal particles, or the primary particles may aggregate to form secondary particles. Secondary particles are crystal particles formed when primary particles are aggregated with one another by chemical bonds (also referred to as twinned crystal particles). The AFX zeolite of the present invention may contain secondary particles (twinned crystal particles) and may further contain both primary particles and secondary particles (twinned crystal particles).

Figure 4:
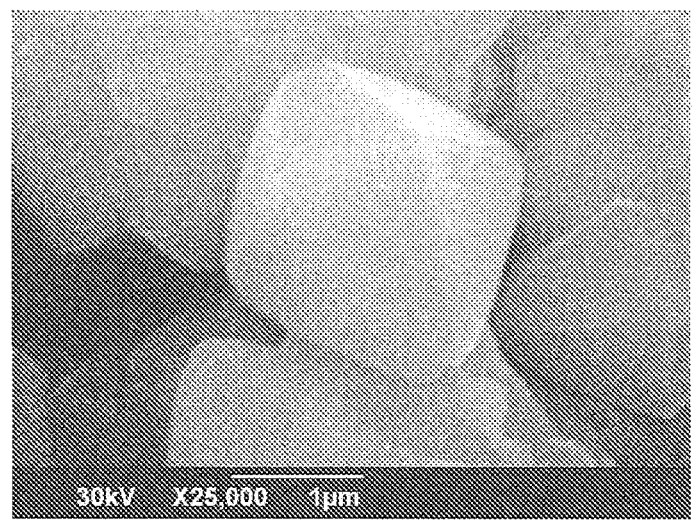
FIG. 4 is an SEM observation image of an AFX zeolite of Example 3.
Figure 5:
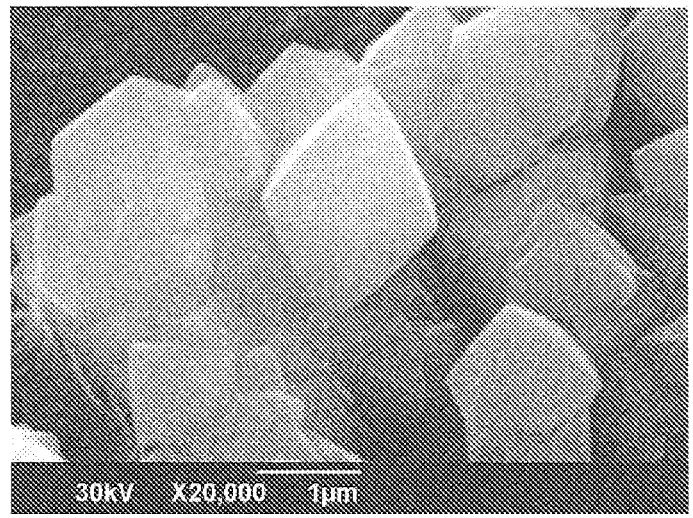
FIG. 5 is an SEM observation image of an AFX zeolite of Reference Example 1.
Figure 6:
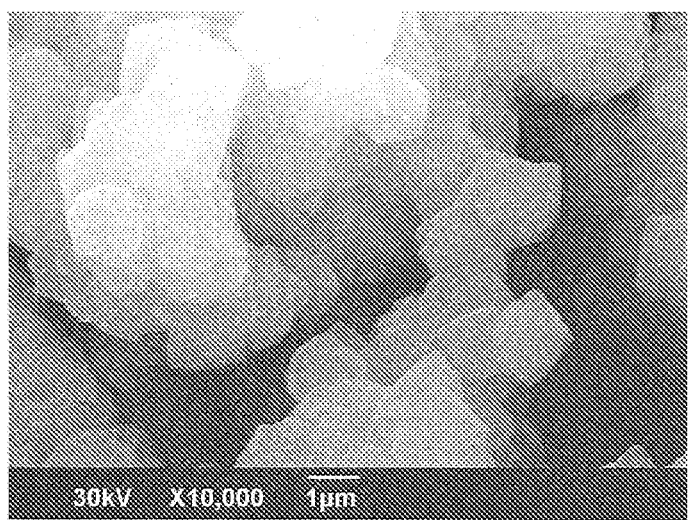
FIG. 6 is an SEM observation image of an AFX zeolite of Example 6.

The shape of the primary particles or secondary particles of the AFX zeolite of the present invention can be confirmed by an SEM observation. For example, it can be clearly observed that independent primary particles are crystal particles including crystals having a hexagonal bipyramids shape. An example of the shape of the crystal particles of the AFX zeolite of the present invention containing independent primary particles is illustrated in FIG. 4. When the primary particles are independent, the crystal planes and ridges of the crystal particles can be clearly observed in an SEM observation. On the other hand, an example of the shape of the crystal particles of the AFX zeolite of the present invention containing secondary particles is illustrated in FIG. 6. In an SEM observation, the crystal planes and ridges of the crystal particles of the secondary particles can be partially observed.

Figure 8:
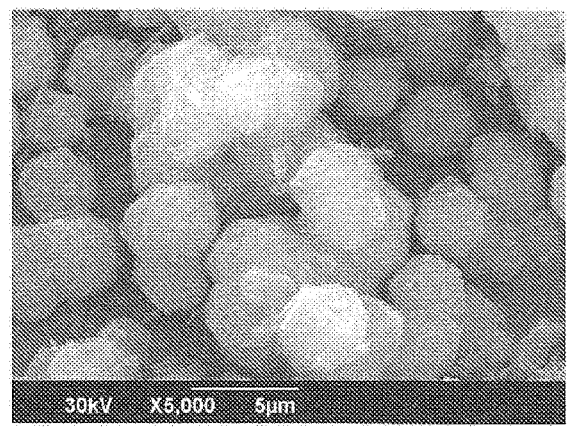
FIG. 8 is an SEM observation image of the AFX zeolite of Comparative Example 9.

In contrast, an example of an AFX zeolite including primary particles not having a hexagonal bipyramids shape is illustrated in FIG. 8. As is clear from FIG. 8, the crystal planes and ridges of primary particles not having a hexagonal bipyramids shape cannot be observed in an SEM observation, and the primary particles have a roughly spherical or indeterminate shape.

The AFX zeolite of the present invention preferably has an average primary particle size of not less than 0.5 μm. When the average primary particle size is not less than 0.5 μm, the heat resistance tends to be higher. When the average primary particle size is not less than 0.8 μm, not less than 1.0 μm, or not less than 1.2 μm, the heat resistance tends to be even higher. The AFX zeolite of the present invention preferably has an average primary particle size of not greater than 5 μm. When the average primary particle size is not greater than 5.0 μm, the operability when honeycomb or the like is coated with the zeolite is enhanced. A more preferable average primary particle size is not greater than 3.0 μm.

The average primary particle size in the present invention is the average particle size of the primary particles. Therefore, the average particle size in the present invention differs between the average secondary particle size determined by averaging the particle sizes of particles, so-called secondary particles (twinned crystal particles), observed as an aggregate of a plurality of primary particles in an SEM observations and the average agglomeration size determined by averaging the agglomeration size of agglomerated particles formed by the agglomeration of primary particles or secondary particles by a physical force.

In the present invention, at least 100 primary particles are observed at random by an SEM observation, and the average primary particle size can be determined from the average value of Feret's horizontal diameter of the observed primary particles.

The amount of silanol groups (Si—OH) in the AFX zeolite of the present invention is preferably small. When the content of silanol groups (referred to as "silanolamount" hereafter) is small, high crystallinity or a micropore structure is maintained even after the AFX zeolite is exposed to a hydrothermal atmosphere of 800° C. or higher, and catalyst characteristics such as the nitrogen oxide reduction characteristics at a low temperature, in particular, the nitrogen oxide reduction characteristics at a low temperature of 150° C. or lower, are enhanced. Therefore, changes in physical properties and characteristics tend to be small before and after being exposed to a hydrothermal atmosphere, which enables the composition to be used as a catalyst or adsorbent with a longer life.

The silanol groups contained in the AFX zeolite exist at the framework ends. More specifically, silanol groups are divided into silanol groups present inside crystals as defects of the AFX zeolite crystals (referred to as "internal silanol" hereafter) and silanol groups present on the outer surfaces of crystals as terminals of the zeolite crystals (referred to as "surface silanol" hereafter). The amounts of both internal silanol and surface silanol in the AFX zeolite of the present invention are preferably small.

The molar ratio of silanol groups to silicon contained in the AFX zeolite of the present invention (referred to as "SiOH/Si" hereafter) is preferably not greater than $0.5 \times 10^{-2}$, more preferably not greater than $0.4 \times 10^{-2}$, and even more preferably not greater than $0.3 \times 10^{-2}$.

The SiOH/Si of an AFX zeolite can be determined from the silanol amount determined from the 1H MAS NMR spectrum with respect to the silicon content of the AFX zeolite.

The silicon content of the AFX zeolite can be determined by an ICP method or another form of composition analysis. An example of a way to determine the silanol amount is to perform 1H MAS NMR measurements on a dehydrated AFX zeolite and then calculating the silanol amount from the resulting 1H MAS NMR spectrum using a calibration curve method.

A more specific method for measuring the silanol amount is to dehydrate the AFX zeolite by holding the AFX zeolite for five hours at 400° C. in vacuum exhaust, collecting and weighing the dehydrated AFX zeolite in a nitrogen atmosphere, and performing 1H MAS NMR measurements. The silanol amount in the AFX zeolite can be determined by a calibration curve method from the integrated intensity of peaks (peaks of 2.0±0.5 ppm) belonging to silanol groups in the 1H MAS NMR spectrum obtained by the aforementioned measurements.

The AFX zeolite of the present invention preferably contains essentially no SDA in the micropores thereof.

The AFX zeolite of the present invention has excellent hydrothermal durability and, in particular, excellent high-temperature hydrothermal durability. Therefore, the AFX zeolite of the present invention may be used as at least one of a catalyst, an adsorbent, and a support material thereof, at least one of a catalyst and an adsorbent exposed to a high temperature and high humidity, and at least one of a catalyst support material and an adsorbent support material, and the AFX zeolite is particularly preferably used as a catalyst or a catalyst support material.

When used in these applications, the AFX zeolite of the present invention may be used in any shape or size. For example, the AFX zeolite of the present invention may be milled, and the milled AFX zeolite of the present invention may be used as at least one of a catalyst, an adsorbent and a support material thereof.

The AFX zeolite of the present invention may also contain a transition metal when used as a catalyst or an adsorbent. Containing a transition metal induces an interaction between the zeolite and the transition metal, which enhances adsorption characteristics such as hydrocarbon adsorption and catalyst characteristics such as the nitrogen oxide reduction. The transition metal contained in the AFX zeolite of the present invention is preferably at least one type selected from the group consisting of groups 8, 9, 10, and 11 of the periodic table, more preferably at least one type selected from the group consisting of platinum (Pt), palladium (Pd), rhodium (Rh), silver (Ag), iron (Fe), copper (Cu), cobalt (Co), manganese (Mn), and indium (In), even more preferably at least either iron or copper, and even more preferably essentially only copper.

When the AFX zeolite of the present invention contains a transition metal, the XRD pattern may shift. The lattice spacing d of the AFX zeolite of the present invention containing a transition metal (also referred to as metal-containing AFX zeolite of the present invention) may be the lattice spacing d according to the table below.

TABLE 5

| Lattice spacing d [Å] | Powder X-ray diffraction peak intensity ratio |
|---|---|
| 11.81 ± 0.13 | Very weak-weak |
| 10.13 ± 0.08 | Moderate |
| 7.59 ± 0.08 | Very strong |
| 6.80 ± 0.06 | Moderate |
| 4.96 ± 0.035 | Weak-moderate |
| 4.34 ± 0.02 | Moderate-strong |
| 4.06 ± 0.02 | Moderate-very strong |

In the above table, it is preferable for the lattice spacing d=4.96±0.035 corresponding to $d_{(004)}$ to be d=4.96±0.03 and more preferably d=4.96±0.02.

The atomic ratio of the transition metal to aluminum (referred to as "Me/Al" hereafter) in the metal-containing AFX zeolite of the present invention is preferably at least 0.20 and more preferably at least 0.30. When the Me/Al is large, characteristics including adsorption characteristics such as hydrocarbon adsorption or catalyst characteristics such as the nitrogen oxide reduction rate tend to be enhanced. On the other hand, a smaller Me/Al allows the transition metal to more easily be present in a dispersed state. In order for the reaction substances of the catalytic reaction and the transition metal to come into contact efficiently, the Me/Al is preferably not higher than 0.50, more preferably not higher than 0.47, and even more preferably not higher than 0.45. When used as a nitrogen oxide reduction catalyst, for example, the Me/Al is preferably not less than 0.2 and not higher than 0.5 and more preferably not less than 0.23 and not higher than 0.47.

The content of the transition metal in the metal-containing AFX zeolite of the present invention is preferably not less than 1.0 wt. %, more preferably not less than 1.5 wt. %, and even more preferably not less than 2.0 wt. %. When the content of the transition metal is not less than 1.0 wt. %, the characteristics of the metal-containing AFX zeolite of the present invention are easily enhanced. On the other hand, the content of the transition metal is preferably not greater than 5.0 wt. %, more preferably not greater than 4.0 wt. %, and even more preferably not greater than 3.5 wt. %. When the content of the transition metal is not more than 5.0 wt. %, side reactions between the excessive transition metal and the aluminum of the zeolite framework are unlikely to occur. The transition metal content is preferably not less than 2 wt. % and not more than 4 wt. % and more preferably not less than 2.6 wt. % and not greater than 3.5 wt. %.

Here, the content of the transition metal (wt. %) refers to the weight of the transition metal with respect to the dry weight of the AFX zeolite of the present invention. The weight of the transition metal can be determined by composition analysis or the like using an inductive coupling plasma emission analysis method.

The AFX zeolite of the present invention preferably contains essentially no SDA in the micropores thereof.

The metal-containing AFX zeolite of the present invention, in particular, a metal-containing AFX zeolite containing at least either iron or copper as a transition metal, has high nitrogen oxide reduction characteristics and excellent heat resistance. Therefore, there are minimal decreases in nitrogen oxide reduction characteristics even after hydrothermal durability treatment, in particular.

Here, hydrothermal durability treatment refers to treatment exposing the zeolite to vapor-containing air at a high temperature. There are no standardized or specified conditions for hydrothermal durability treatment. On the other hand, the thermal load on the zeolite due to hydrothermal durability treatment becomes large as a result of either increasing the treatment temperature or lengthening the treatment time. The collapse of the zeolite, such as the dissociation of aluminum from the zeolite framework, tends to occur more readily when the thermal load becomes large. The nitrogen oxide reduction characteristics of the zeolite after hydrothermal durability treatment are diminished due to the collapse of the zeolite.

The hydrothermal durability treatment in the present invention may be treatment performed under the following conditions.

Treatment temperature: 900° C.
Atmosphere: air containing 10 vol. % of $H_2O$
Spatial velocity (SV): 6000 $hr^{-1}$
Treatment time: 1 to 5 h Next, the production method of the AFX zeolite of the present invention will be described.

The AFX zeolite of the present invention can be produced by a production method comprising a crystallization step of crystallizing a composition at a temperature of not lower than 160° C.; the composition containing a silicon source, an aluminum source, a 1,3-di(1-adamantyl)imidazolium cation, and an alkali metal; a molar ratio of hydroxide ions to silica being less than 0.25 or a molar ratio of silica to alumina being not higher than 27; and a molar ratio of the 1,3-di(1-adamantyl)imidazolium cation to silica being less than 0.20.

In the production method of the present invention, the composition containing the silicon source, the aluminum source, the 1,3-di(1-adamantyl)imidazolium cation (also referred to as "DAdI" hereafter), and the alkali metal source (also referred to as "raw material composition" hereafter) is crystallized.

The silicon source is silica ($SiO_2$) or a silicon compound serving as a precursor thereof, examples of which include at least one type selected from the group consisting of colloidal silica, amorphous silica, sodium silicate, tetraethyl orthosilicate, precipitated silica, fumed silica, zeolite, and aluminosilicate gel.

The aluminum source is alumina ($Al_2O_3$) or an aluminum compound serving as a precursor thereof, examples of which include at least one type selected from the group consisting of aluminum sulfate, sodium aluminate, aluminum hydroxide, aluminum chloride, aluminosilicate gel, zeolite, and metal aluminum.

The alkali metal (M) is preferably contained in the raw material composition as a hydroxide of an alkali metal or a halide of an alkali metal, and is particularly preferably contained in the raw material composition as a basic hydroxide of an alkali metal. Specifically, the alkali metal may be contained in the raw material composition as at least one type selected from the group consisting of sodium hydroxide, potassium hydroxide, rubidium hydroxide, and cesium hydroxide or an alkali component contained in at least one of the silicon source and the aluminum source.

$DAdI^+$ functions as an SDA. $DAdI^+$ is preferably contained in the raw material composition as a compound in the form of at least a hydroxide or a halide thereof. A specific example of a $DAdI^+$-containing compound is at least one type selected from the group consisting of 1,3-di(1-adamantyl)imidazolium hydroxide (referred to as "DAdIOH" hereafter), 1,3-di(1-adamantyl)imidazolium bromide (referred to as "DAdIBr" hereafter), 1,3-di(1-adamantyl)imidazolium chloride (referred to as "DAdICl" hereafter), and 1,3-di(1-adamantyl)imidazolium iodide (referred to as "DAdII" hereafter). The compound is preferably at least one type selected from the group consisting of DAdIBr, DAdICl, and DAdII, and more preferably DAdIBr.

The molar ratio of the 1,3-di(1-adamantyl)imidazolium cation to the silica of the raw material composition (also referred to as "$DAdI^+/SiO_2$" hereafter) is less than 0.20. The $DAdI^+/SiO_2$ is preferably less than 0.20, more preferably not higher than 0.15, even more preferably not higher than 0.10, and even more preferably not higher than 0.06. As a result, SDAs which do not contribute to the crystallization of the raw material composition are further reduced. The $DAdI^+/SiO_2$ is preferably not less than 0.02, more preferably not less than 0.03, and even more preferably not less than 0.04. As a result, the production of a zeolite having a structure other than an AFX structure is further suppressed.

In the composition of the raw material composition, the molar ratio of water to silica (referred to as "$H_2O/SiO_2$" hereafter) is preferably not less than 5 and not higher than 60. When the $H_2O/SiO_2$ is within this range, the resulting mixture has a viscosity such that moderate stirring is possible during crystallization. In addition, the $H_2O/SiO_2$ is preferably less than 60, more preferably not higher than 45, and even more preferably not higher than 40. As a result, crystallization becomes easy even if the molar ratio of the hydroxide ion in the solution with respect to silica (referred to as "$OH/SiO_2$" hereafter) is low.

In the raw material composition, it is preferable that either the molar ratio of the hydroxide ion to silica (also referred to as "$OH/SiO_2$" hereafter) is less than 0.25 or the molar ratio of silica to alumina (also referred to as "$SiO_2/Al_2O_3$" hereafter) is not higher than 27, and it is more preferable that either the $OH/SiO_2$ is not less than 0.06 and less than 0.25 or the $SiO_2/Al_2O_3$ is not less than 10 and not higher than 27.

The crystallization behavior of a zeolite having a composition containing $DAdI^+$ as a raw material is greatly affected by the hydroxide ion concentration.

When the hydroxide ion concentration of the composition is low, the AFX zeolite tends to be crystallized easily, and the difference in the $SiO_2/Al_2O_3$ between the raw material composition and the obtained AFX zeolite tends to become small. A raw material composition having an $OH/SiO_2$ of less than 0.25 (also referred to as a "low-alkali raw material" hereafter) tends to accelerate the crystallization of the AFX zeolite. Therefore, the AFX zeolite is crystallized easily over a wide range of $SiO_2/Al_2O_3$ of the raw material composition in the low-alkali raw material, and an AFX zeolite having the target $SiO_2/Al_2O_3$ becomes easy to be obtained. The $OH/SiO_2$ of the low-alkali raw material is less than 0.25 and is preferably not less than 0.06 and less than 0.25.

On the other hand, when the hydroxide ion concentration of the composition is high, the crystallization rate increases, but zeolites of structures other than an AFX zeolite are crystallized easily. With a raw material composition having an $OH/SiO_2$ of not less than 0.25 (also referred to as a "high-alkali raw material" hereafter), the progression of the crystallization of AFX zeolites, in particular, is inhibited. Therefore, when the $SiO_2/Al_2O_3$ of the raw material composition exceeds 27 in the high-alkali raw material, the progression of the crystallization of an AFX zeolite from a composition containing $DAdI^+$, in particular, is inhibited. Even if an AFX zeolite were crystallized from a high-alkali raw material having an $SiO_2/Al_2O_3$ higher than 27, crystal growth is insufficient, so the resulting AFX zeolite tends to have a low high-temperature hydrothermal durability. The $OH/SiO_2$ of the high-alkali raw material is not less than 0.25, preferably not less than 0.25 and less than 0.40 and, even more preferably not less than 0.25 and less than 0.35.

The $OH/SiO_2$ of the raw material composition is preferably not less than 0.06, more preferably not less than 0.08, even more preferably not less than 0.10, even more preferably not less than 0.12, and even more preferably not less than 0.14. This accelerates the dissolution of the raw materials, which increases the rate of crystal growth.

The $SiO_2Al_2O_3$ of the low-alkali raw material is preferably not less than 10, more preferably not less than 12, even more preferably not less than 14, and even more preferably not less than 15. This further enhances the heat resistance of the resulting AFX zeolite. On the other hand, the $SiO_2/Al_2O_3$ is preferably not higher than 100, more preferably not higher than 45, even more preferably not higher than 35, even more preferably not higher than 32, and even more preferably not higher than 30. This causes an increase in the solid acid amount of the resulting AFX zeolite, which enhances the chemical adsorption characteristics and makes it possible to exchange large quantities of metal ions.

The molar ratio of the alkali metal in the solution with respect to silica (referred to as "$M/SiO_2$" hereafter) is preferably not less than 0.06, more preferably not less than 0.08, even more preferably not less than 0.10, even more preferably not less than 0.12, and even more preferably not less than 0.14. This accelerates the dissolution of the raw materials, which increases the rate of crystal growth. In addition, the $M/SiO_2$ is preferably less than 0.25, more preferably not higher than 0.22, even more preferably not higher than 0.20, and even more preferably not higher than 0.18. As a result, the production of impurities is suppressed, so the yield of silica increases.

The low-alkali raw material preferably has the following composition. Note that M in the following composition represents an alkali metal, and each ratio is the molar (mol) ratio.
  $SiO_2/Al_2O_3$: not less than 10 and less than 100
  $OH/SiO_2$: not less than 0.06 and less than 0.25
  $M/SiO_2$: not less than 0.06 and less than 0.25
  $DAdI^+/SiO_2$: not less than 0.02 and less than 0.20
  $H_2O/SiO_2$: not less than 5 and less than 60

The low-alkali raw material more preferably has the following composition.
  $SiO_2/Al_2O_3$: not less than 15 and not higher than 45
  $OH/SiO_2$: not less than 0.08 and not higher than 0.22
  $M/SiO_2$: not less than 0.08 and not higher than 0.22
  $DAdI/SiO_2$: not less than 0.03 and not higher than 0.15
  $H_2O/SiO_2$: not less than 5 and less than 60

Further, the low-alkali raw material even more preferably has the following composition.
  $SiO_2/Al_2O_3$: not less than 15 and not higher than 30
  $OH/SiO_2$: not less than 0.10 and not higher than 0.20
  $M/SiO_2$: not less than 0.10 and not higher than 0.20
  $DAdI^+/SiO_2$: not less than 0.04 and not higher than 0.10
  $H_2O/SiO_2$: not less than 5 and less than 60

The $SiO_2/Al_2O_3$ of the high-alkali raw material is preferably not less than 10, more preferably not less than 12, even more preferably not less than 14, and even more preferably not less than 15. This further enhances the heat resistance of the resulting AFX zeolite. In addition, the $SiO_2/Al_2O_3$ is preferably not higher than 27, more preferably not higher than 25, even more preferably not higher than 22. This causes an increase in the solid acid amount, which enhances the chemical adsorption characteristics and makes it possible to exchange large quantities of metal ions.

The $M/SiO_2$ of the high-alkali raw material is preferably less than 0.40, more preferably not higher than 0.35, and even more preferably not higher than 0.30. As a result, the production of a zeolite having a structure other than an AFX structure is suppressed. The $M/SiO_2$ is preferably not less than 0.1 and more preferably not less than 0.15.

The high-alkali raw material preferably has the following composition.
  $SiO_2/Al_2O_3$: not less than 10 and not higher than 25
  $OH/SiO_2$: not less than 0.25 and less than 0.40
  $M/SiO_2$: not less than 0.25 and less than 0.40
  $DAdI^+/SiO_2$: not less than 0.02 and less than 0.20
  $H_2O/SiO_2$: not less than 5 and less than 60

The high-alkali raw material more preferably has the following composition.
  $SiO_2/Al_2O_3$: not less than 15 and not higher than 25
  $OH/SiO_2$: not less than 0.25 and not higher than 0.35
  $M/SiO_2$: not less than 0.25 and not higher than 0.35
  $DAdI^+/SiO_2$: not less than 0.03 and not higher than 0.15
  $H_2O/SiO_2$: not less than 5 and less than 60

The crystallization step is performed at a temperature of not less than 160° C. When the crystallization temperature is less than 160° C., not only is an AFX zeolite not obtained, but there are also cases in which the raw material composition is not crystallized. The crystallization temperature is more preferably not lower than 160° C. and not higher than 190° C., and more preferably not lower than 170° C. and not higher than 190° C. As a result, an AFX zeolite having high crystallinity is easily obtained.

The crystallization method of the raw material composition may be selected as needed. A preferable crystallization method is to perform hydrothermal treatment on the raw material composition. Hydrothermal treatment may comprise placing the raw material composition in an airtight, pressure-resistant container and then heating the container. The following may be used as hydrothermal treatment conditions.
  Treatment time: not less than 2 hours and not more than 500 hours
  Treatment pressure: autogenous pressure A more preferable hydrothermal treatment time is not less than 10 hours and not more than 240 hours.

During hydrothermal treatment, the raw material composition may be in a static state or in a stirred state. In order for the composition of the resulting AFX zeolite to be more uniform, crystallization is preferably performed in a state in which the raw material composition is stirred.

In the production method of the present invention, a washing step and a drying step or an SDA removal step may be included after the crystallization step.

In the washing step, the AFX zeolite and the liquid phase are subjected to solid-liquid separation from the product after the crystallization step. In the washing step, solid-liquid separation is performed with a known method, and the AFX zeolite obtained as a solid phase is required to be washed with purified water. A specific example is a method that includes filtering the mixture, subjected to hydrothermal treatment, to separate the mixture into a liquid phase and a solid phase followed by washing, and thereby obtaining an AFX zeolite.

In the drying step, the water content is removed from the AFX zeolite after the crystallization step or after the washing step. The conditions of the drying step are discretionary, but an example is drying the mixture after the crystallization step or the AFX zeolite obtained after the washing step by treating the mixtures or the zeolite for not less than two hours in the atmosphere under conditions at a temperature of not lower than 100° C. and not higher than 150° C. An example of a drying method is leaving the composition to stand or using a spray dryer.

In the SDA removal step, SDA removal may be performed by calcination or decomposition, for example.

Calcination is performed at a temperature of not lower than 400° C. and not higher than 800° C. Calcination is more preferably performed at a temperature of not higher than 700° C. As a result, an AFX zeolite having little dealumination is easily obtained. An example of more specific heat treatment conditions is 1 to 2 hours at 600° C. in the atmosphere.

The production method of the present invention may have an ammonium treatment step as necessary.

The ammonium treatment step is performed in order to remove alkali metals contained in the AFX zeolite so as to convert the cation type to an ammonium type (referred to as "$NH_4^+$ type" hereafter). The ammonium treatment step may be performed, for example, by bringing an aqueous solution containing ammonium ions into contact with the AFX zeolite.

In the case of an $NH_4^+$ type AFX zeolite, heat treatment may be performed once again. This heat treatment yields an AFX zeolite in which the cation type is a proton type (referred to as "$H^+$ type" hereafter). An example of more specific heat treatment conditions is 1 to 2 hours at 500° C. in the atmosphere.

When the AFX zeolite of the present invention contains a transition metal, the production method of the present invention may have a transition metal addition step for adding a transition metal to the AFX zeolite.

The transition metal used in the transition metal adding step is preferably a compound containing at least one type of transition metal selected from the group consisting of groups 8, 9, 10, and 11 of the periodic table, more preferably a compound containing at least one type selected from the group consisting of platinum (Pt), palladium (Pd), rhodium (Rh), silver (Ag), iron (Fe), copper (Cu), cobalt (Co), manganese (Mn), and indium (In), even more preferably a compound containing at least either iron or copper, and even more preferably a compound containing copper. The compound containing a transition metal may be at least one type selected from the group consisting of nitrates, sulfates, acetates, chlorides, complex salts, oxides, and complex oxides of these transition metals.

Examples of methods for adding a transition metal to the AFX zeolite include a method of mixing the AFX zeolite and the transition metal compound (referred to as a "post-adding method" hereafter) and a method of adding at least one type of transition metal compound to the raw material composition and crystallizing the raw material composition (referred to as a "pre-adding method" hereafter).

The post-adding method may be, for example, at least one type selected from the group consisting of an ion exchange method, an incipient wetness impregnation method, an evaporation drying method, a precipitation method, and a physical mixing method.

An example of a pre-adding method is a method of crystallizing a raw material composition containing a transition metal. The raw material composition containing the transition metal may be a raw material composition obtained by adding a transition metal in the mixing step or a raw material composition using a compound obtained by adding a transition metal to any one or more of a silicon source, an aluminum source, an alkali source, and $DAdI^+$.

As a result of containing a transition metal, the AFX zeolite of the present invention can be used as a nitrogen oxide reduction catalyst and, in particular, as an SCR catalyst. Further, the zeolite can be used as an SCR catalyst for a diesel automobile having a high exhaust gas temperature.

A nitrogen oxide reduction catalyst containing the AFX zeolite of the present invention can be used in a nitrogen oxide reduction method.

EXAMPLES

The present invention will be described in detail with reference to examples hereinafter. However, the present invention is not limited to these examples.

Powder X-Ray Diffraction

XRD measurements were performed on a sample using a typical X-ray diffraction device (device name: MXP-3, manufactured by MAC Science). The measurement conditions were as follows.

Radiation source: CuKα radiation ($\lambda$=1.5405 Å)
Measurement mode: step scan
Scanning condition: 0.01°/sec
Divergence slit: 1.00 deg
Scattering slit: 1.00 deg
Receiving slit: 0.30 mm
Measurement time: 1.00 sec
Measurement range: 2θ=3.0° to 43.0°

The crystal phase, the lattice spacing d, and the XRD peak intensity ratio of the product obtained in the crystallization step were confirmed from the resulting XRD pattern.

Quantification of Silicon, Aluminum, and Copper

The sample was subjected to compositional analysis using a typical inductive coupling plasma emission analysis device (device name: OPTIMA 3000DV, manufactured by Perkin Elmer). A measurement solution was prepared by dissolving the sample in a mixed solution of hydrofluoric acid and nitric acid. The obtained measurement solution was charged into the device, and the composition of the sample was analyzed. The $SiO_2/Al_2O_3$ and the Cu/Al were calculated from the resulting molar concentrations of silicon (Si), aluminum (Al), and copper (Cu).

Evaluation of SCR Catalyst Activity of the Nitrogen Oxide Reduction Rate

The nitrogen oxide reduction rate of the sample was measured by the following ammonia SCR method.

The sample was press-molded, and after the obtained pellet was passed through a 12- to 20-mesh sieve, the pellet that passed through the sieve was used as a sieved pellet. A reaction tube was filled with 1.5 mL of the obtained sieved pellet. The reaction tube was then heated to each temperature of 150° C., 200° C., 300° C., 400° C., and 500° C., and a treatment gas having the following composition was introduced into the reaction tube.

NO: 200 ppm
$NH_3$: 200 ppm
$O_2$: 10 vol. %
$H_2O$: 3 vol. %
Remainder: $N_2$

Measurements were taken at a treatment gas flow rate of 1.5 L/min and a space velocity (SV) of 60000 $hr^{-1}$.

The nitrogen oxide concentration (ppm) in the treatment gas after being introduced into the reaction tube was determined, and the nitrogen oxide reduction rate was determined in accordance with the following equation.

Nitrogen oxide reduction rate (%)=(1−(nitrogen oxide concentration in treatment gas after reaction tube introduction/nitrogen oxide concentration in treatment gas before reaction tube introduction))×100

Silanol Group Content Measurement Method

The content of silanol groups in the AFX zeolite was measured by 1H MAS NMR.

Prior to measurements, the sample was pre-treated by holding the sample for five hours at 400° C. in vacuum exhaust to dehydrate. After the pretreatment, the sample that was cooled to room temperature was collected and weighed in a nitrogen atmosphere. A typical NMR measurement device (device name: VXR-300S, manufactured by Varian) was used as the measurement device. The measurement conditions were as follows.

Resonance frequency: 300.0 MHz
Pulse width: π/2
Measurement waiting time: 10 sec
Cumulative number: 32 times
Rotational frequency: 4 kHz
Shift standard: TMS A peak associated with a silanol group was waveform-separated from the resulting 1H MAS NMR spectrum, and the integrated intensity thereof was determined. The silanol amount in the sample was determined by a calibration curve method from the resulting integrated intensity.

Synthesis of AFX Zeolite

Example 1

Prescribed amounts of No. 3 sodium silicate ($SiO_2$: 30%, $Na_2O$: 9.1%, $Al_2O_3$: 0.01%), 98% sulfuric acid, water, and aluminum sulfate were mixed, and the produced gel was subjected to solid-liquid separation and washed with purified water. After washing, prescribed amounts of water, DAdIBr, and 48% NaOH were added to the gel and thoroughly mixed while stirring. The composition of the resulting mixture (raw material composition) was as follows in terms of molar ratios.

$SiO_2/Al_2O_3=27.5$
$OH/SiO_2=0.15$
$Na/SiO_2=0.15$
$DAdIBr/SiO_2=0.05$
$H_2O/SiO_2=40$

The resulting mixture was sealed in a stainless steel autoclave and heated for 48 hours at 180° C. while rotating the autoclave to obtain a product.

Figure 2:
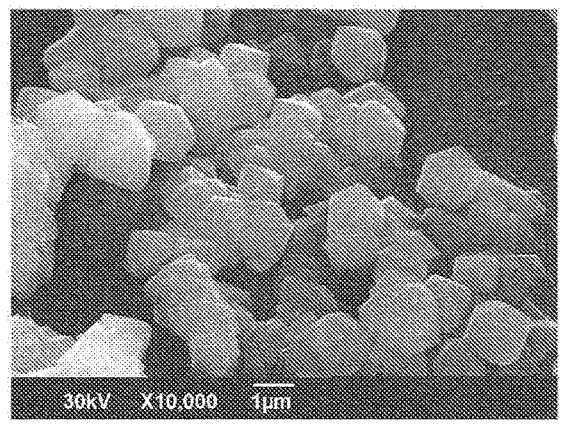
FIG. 2 is an SEM observation image of the AFX zeolite of Example 1.

The product was filtered, washed, and then dried overnight at 110° C. in the atmosphere. The dried product was calcined for two hours at 600° C. in air. The calcined product was subjected to ion exchange using a 20% ammonium chloride aqueous solution. As a result of XRD measurements, it was confirmed that the product after ion exchange was an AFX zeolite and that the AFX zeolite had the lattice spacing d and the XRD peak intensity ratio of the present invention, as shown in the table below. The XRD pattern is shown in FIG. 1. The $SiO_2/Al_2O_3$ of this zeolite was 25.6. It was confirmed that the primary particles of this zeolite had a hexagonal bipyramids shape. An SEM observation image is shown in FIG. 2. It can be confirmed from FIG. 2 that the AFX zeolite of this example contains independent particles having a hexagonal bipyramids shape and twin crystal particles. In addition, the SiOH/Si of this zeolite was 0.28× $10^{-2}$. The c-axis length determined from $d_{(004)}$ was 19.84 Å.

TABLE 6

| Lattice spacing d [Å] | XRD peak intensity ratio |
|---|---|
| 11.84 | 20 |
| 10.16 | 100 |
| 7.60 | 85 |
| 6.81 | 71 |
| 4.96 | 27 |
| 4.34 | 43 |
| 4.06 | 47 |

Example 2

A mixture was prepared with the same method as in Example 1 with the exception that the mixture had the following composition. The composition of the mixture was as follows in terms of molar ratios.

$SiO_2/Al_2O_3=23.7$
$OH/SiO_2=0.15$
$Na/SiO_2=0.15$
$DAdIBr/SiO_2=0.05$
$H_2O/SiO_2=40$

The resulting mixture was sealed in a stainless steel autoclave and heated for 48 hours at 180° C. while rotating the autoclave to obtain a product.

Figure 3:
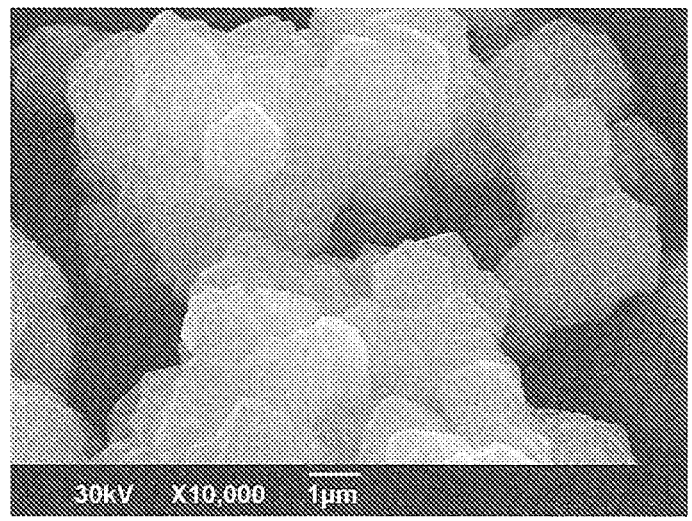
FIG. 3 is an SEM observation image of an AFX zeolite of Example 2.

The product was filtered, washed, and then dried overnight at 110° C. in the atmosphere. The dried product was calcined for two hours at 600° C. in air. As a result of XRD measurements, it was confirmed that the product after calcination was an AFX zeolite, that the product had the same lattice spacing d as in Table 3 and a $d_{(004)}$ value of 4.96, and that the product had the same XRD peak intensity ratio as in Table 3. The XRD pattern was the same pattern as in FIG. 1. The $SiO_2/Al_2O_3$ of this zeolite was 23.2. It was confirmed that the zeolite particles had a hexagonal bipyramids shape. An SEM observation image is shown in FIG. 3.

Example 3

A mixture was prepared with the same method as in Example 1 with the exception that the mixture had the following composition. The composition of the mixture was as follows in terms of molar ratios.

$SiO_2/Al_2O_3=19.8$
$OH/SiO_2=0.15$
$Na/SiO_2=0.15$
$DAdIBr/SiO_2=0.05$
$H_2O/SiO_2=40$

The resulting mixture was sealed in a stainless steel autoclave and heated for 48 hours at 180° C. while rotating the autoclave to obtain a product.

The product was filtered, washed, and then dried overnight at 110° C. in the atmosphere. The dried product was calcined for two hours at 600° C. in air. As a result of XRD measurements, it was confirmed that the product after calcination was an AFX zeolite, that the product had the same lattice spacing d as in Table 3 and a $d_{(004)}$ value of 4.96, and that the product had the same XRD peak intensity ratio as in Table 3. The XRD pattern was the same pattern as in FIG. 1. The $SiO_2/Al_2O_3$ of this zeolite was 19.7. It was confirmed that the crystal state of the zeolite particles was the same hexagonal bipyramids shape as in Example 1.

Example 4

A mixture was prepared with the same method as in Example 1 with the exception that the mixture had the following composition. The composition of the mixture was as follows in terms of molar ratios.

$SiO_2/Al_2O_3=19.8$
$OH/SiO_2=0.25$
$Na/SiO_2=0.25$
$DAdIBr/SiO_2=0.05$
$H_2O/SiO_2=40$

The resulting mixture was sealed in a stainless steel autoclave and heated for 48 hours at 180° C. while rotating the autoclave to obtain a product.

The product was filtered, washed, and then dried overnight at 110° C. in the atmosphere. The dried product was calcined for two hours at 600° C. in air. As a result of XRD measurements, it was confirmed that the product after calcination was an AFX zeolite and that the AFX zeolite had the lattice spacing d and the XRD peak intensity ratio according to the table below. The XRD pattern was the same pattern as in FIG. 1. The $SiO_2/Al_2O_3$ of this zeolite was 16.9. It was confirmed that the zeolite particles had a hexagonal bipyramids shape.

TABLE 7

| Lattice spacing d [Å] | XRD peak intensity ratio |
|---|---|
| 11.86 | 22 |
| 10.17 | 100 |
| 7.62 | 100 |
| 6.83 | 81 |
| 4.97 | 48 |
| 4.35 | 64 |
| 4.07 | 74 |

Example 5

A mixture was prepared with the same method as in Example 1 with the exception that the mixture had the following composition. The composition of the mixture was as follows in terms of molar ratios.

$SiO_2/Al_2O_3$=15.8

$OH/SiO_2$=0.20

$Na/SiO_2$=0.20

$DAdIBr/SiO_2$=0.05

$H_2O/SiO_2$=40

The resulting mixture was sealed in a stainless steel autoclave and heated for 48 hours at 180° C. while rotating the autoclave to obtain a product.

The product was filtered, washed, and then dried overnight at 110° C. in the atmosphere. The dried product was calcined for two hours at 600° C. in air. As a result of XRD measurements, it was confirmed that the product after calcination was an AFX zeolite and that the AFX zeolite had the lattice spacing d and the XRD peak intensity ratio according to the table below. The XRD pattern was the same pattern as in FIG. 1. The $SiO_2/Al_2O_3$ of this zeolite was 14.6. It was confirmed that the zeolite particles had a hexagonal bipyramids shape.

TABLE 8

| Lattice spacing d [Å] | XRD peak intensity ratio |
| --- | --- |
| 11.82 | 20 |
| 10.17 | 93 |
| 7.60 | 100 |
| 6.83 | 80 |
| 4.95 | 43 |
| 4.35 | 65 |
| 4.07 | 79 |

Reference Example 1

A mixture was prepared with the same method as in Example 1 with the exception that the mixture had the following composition. The composition of the mixture was as follows in terms of molar ratios.

$SiO_2/Al_2O_3$=43.4

$OH/SiO_2$=0.12

$Na/SiO_2$=0.12

$DAdIBr/SiO_2$=0.05

$H_2O/SiO_2$=40

The resulting mixture was sealed in a stainless steel autoclave and heated for 48 hours at 180° C. while rotating the autoclave to obtain a product.

The product was filtered, washed, and then dried overnight at 110° C. in the atmosphere. The dried product was calcined for two hours at 600° C. in air. As a result of XRD measurements, it was confirmed that the product after calcination was an AFX zeolite and that the AFX zeolite had the lattice spacing d and the XRD peak intensity ratio according to the table below. The XRD pattern was the same pattern as in FIG. 1. The $SiO_2/Al_2O_3$ of this zeolite was 42.9. It was confirmed that the zeolite particles had a hexagonal bipyramids shape.

TABLE 9

| Lattice spacing d [Å] | XRD peak intensity ratio |
| --- | --- |
| 11.76 | 22 |
| 10.13 | 100 |
| 7.59 | 80 |
| 6.80 | 70 |
| 4.96 | 27 |
| 4.34 | 41 |
| 4.06 | 42 |

Reference Example 2

A reaction mixture was prepared with the same method as in Example 1 with the exception that the mixture had the following composition. The composition of the mixture was as follows in terms of molar ratios.

$SiO_2/Al_2O_3$=43.4

$OH/SiO_2$=0.15

$Na/SiO_2$=0.15

$DAdIBr/SiO_2$=0.05

$H_2O/SiO_2$=40

The resulting mixture was sealed in a stainless steel autoclave and heated for 48 hours at 180° C. while rotating the autoclave to obtain a product.

The product was filtered, washed, and then dried overnight at 110° C. in the atmosphere. The dried product was calcined for two hours at 600° C. in air. As a result of XRD measurements, it was confirmed that the product after calcination was an AFX zeolite, that the product had the same lattice spacing d as in Table 3 and a $d_{(004)}$ value of 4.96, and that the product had the same XRD peak intensity ratio as in Table 3. The XRD pattern was the same pattern as in FIG. 1. The $SiO_2/Al_2O_3$ of this zeolite was 44.2. It was confirmed that the zeolite particles had the same hexagonal bipyramids shape as in Example 1.

Example 6

A mixture was prepared with the same method as in Example 1 with the exception that the mixture had the following composition. The composition of the mixture was as follows in terms of molar ratios.

$SiO_2/Al_2O_3$=32.0

$OH/SiO_2$=0.15

$Na/SiO_2$=0.15

$DAdIBr/SiO_2$=0.05

$H_2O/SiO_2$=40

The resulting mixture was sealed in a stainless steel autoclave and heated for 48 hours at 180° C. while rotating the autoclave to obtain a product.

The product was filtered, washed, and then dried overnight at 110° C. in the atmosphere. The dried product was calcined for two hours at 600° C. in air. As a result of XRD measurements, it was confirmed that the product after calcination was an AFX zeolite, that the product had the same lattice spacing d as in Table 3 and a $d_{(004)}$ value of 4.96, and that the product had the same XRD peak intensity ratio as in Table 3. The XRD pattern was the same pattern as in FIG. 1. The $SiO_2/Al_2O_3$ of this zeolite was 29.9. It was confirmed that the zeolite particles had the same hexagonal bipyramids shape as in Example 1.

Example 7

Water, sodium aluminate ($Na_2O$: 19.1%, $Al_2O_3$: 19.6%), DAdIBr, 48% NaOH, and a seed crystal were added to precipitated silica (trade name: Nipsil VN-3, manufactured by Tosoh Silica Corporation) and thoroughly mixed while stirring. The composition of the mixture was as follows in terms of molar ratios.

$SiO_2/Al_2O_3$=19.8
$OH/SiO_2$=0.20
$Na/SiO_2$=0.20
$DAdIBr/SiO_2$=0.05
$H_2O/SiO_2$=40

The resulting mixture was sealed in a stainless steel autoclave and heated for 48 hours at 180° C. while rotating the autoclave to obtain a product.

The product was filtered, washed, and then dried overnight at 110° C. in the atmosphere. The dried product was calcined for two hours at 600° C. in air. As a result of XRD measurements, it was confirmed that the product after calcination was an AFX zeolite, that the product had the same lattice spacing d as in Table 3 and a $d_{(004)}$ value of 4.93, and that the product had the same XRD peak intensity ratio as in Table 2. The XRD pattern was the same pattern as in FIG. 1. The $SiO_2/Al_2O_3$ of this zeolite was 18.9.

Example 8

A mixture was prepared with the same method as in Example 7 with the exception that the mixture had the following composition. The composition of the mixture was as follows in terms of molar ratios.

$SiO_2/Al_2O_3$=32.0
$OH/SiO_2$=0.15
$Na/SiO_2$=0.15
$DAdIBr/SiO_2$=0.05
$H_2O/SiO_2$=40

The resulting mixture was sealed in a stainless steel autoclave and heated for 48 hours at 180° C. while rotating the autoclave to obtain a product.

The product was filtered, washed, and then dried overnight at 110° C. in the atmosphere. The dried product was calcined for two hours at 600° C. in air. As a result of XRD measurements, it was confirmed that the product after calcination was an AFX zeolite, that the product had the same lattice spacing d as in Table 3 and a $d_{(004)}$ value of 4.928, and that the product had the same XRD peak intensity ratio as in Table 3. The XRD pattern was the same pattern as in FIG. 1. The $SiO_2/Al_2O_3$ of this zeolite was 30.6.

Example 9

A mixture was prepared with the same method as in Example 1 with the exception that the mixture had the following composition. The composition of the mixture was as follows in terms of molar ratios.

$SiO_2/Al_2O_3$=34.0
$OH/SiO_2$=0.15
$Na/SiO_2$=0.15
$DAdIBr/SiO_2$=0.05
$H_2O/SiO_2$=40

The resulting mixture was sealed in a stainless steel autoclave and heated for 48 hours at 180° C. while rotating the autoclave to obtain a product.

The product was filtered, washed, and then dried overnight at 110° C. in the atmosphere. The dried product was calcined for two hours at 600° C. in air. As a result of XRD measurements, it was confirmed that the product after calcination was an AFX zeolite, that the product had the same lattice spacing d as in Table 3 and a $d_{(004)}$ value of 4.96, and that the product had the same XRD peak intensity ratio as in Table 3. The XRD pattern was the same pattern as in FIG. 1. The $SiO_2/Al_2O_3$ of this zeolite was 31.7.

Hereafter, an investigation was performed with formulas according to the methods disclosed in Non-Patent Documents 3 and 4.

Comparative Example 1

Prescribed amounts of water, DAdIOH, 48% NaOH, and Y-type zeolite (trade name: HSZ-320NAA, manufactured by Tosoh Corporation) were added to precipitated silica (trade name: Nipsil VN-3, manufactured by Tosoh Silica Corporation) and thoroughly mixed while stirring. The composition of the mixture was as follows in terms of molar ratios.

$SiO_2/Al_2O_3$=25.0
$OH/SiO_2$=0.25
$Na/SiO_2$=0.05
$DAdIOH/SiO_2$=0.20
$H_2O/SiO_2$=30

The resulting reaction mixture was sealed in a stainless steel autoclave and heated for 192 hours (8 days) at 150° C. while rotating the autoclave to obtain a product.

The product was filtered, washed, and then dried overnight at 110° C. in the atmosphere. As a result of XRD measurements, the dried product contained both an FAU-type crystal phase and an amorphous phase.

This comparative example is an example in which the $SiO_2/Al_2O_3$ of the mixture was changed in the method disclosed in Non-Patent Document 4, but an AFX zeolite was not obtained.

Comparative Example 2

Prescribed amounts of water, DAdIBr, 48% NaOH, and Y-type zeolite (HSZ-320NAA, manufactured by Tosoh Corporation) were added to precipitated silica (trade name: Nipsil VN-3, manufactured by Tosoh Silica Corporation) and thoroughly mixed while stirring. The composition of the mixture was as follows in terms of molar ratios.

$SiO_2/Al_2O_3$=35.0
$OH/SiO_2$=0.25
$Na/SiO_2$=0.25
$DAdIBr/SiO_2$=0.10
$H_2O/SiO_2$=30

The resulting reaction mixture was sealed in a stainless steel autoclave and heated for 192 hours (8 days) at 150° C. while rotating the autoclave to obtain a product.

The product was filtered, washed, and then dried overnight at 110° C. in the atmosphere. As a result of XRD measurements, the dried product was amorphous.

This comparative example is an example in which DAdIBr was used as an SDA and the $OH/SiO_2$ and the $DadI^+/SiO_2$ of the mixture were changed in the method disclosed in Non-Patent Document 3, but an AFX zeolite was not obtained.

Comparative Example 3

A mixture was prepared with the same method as in Comparative Example 2 with the exception that the mixture had the following composition. The composition of the mixture was as follows in terms of molar ratios.

$SiO_2/Al_2O_3=25.0$
$OH/SiO_2=0.15$
$Na/SiO_2=0.15$
$DAdIBr/SiO_2=0.10$
$H_2O/SiO_2=30$

The resulting reaction mixture was sealed in a stainless steel autoclave and heated for 192 hours (8 days) at 150° C. while rotating the autoclave to obtain a product.

The product was filtered, washed, and then dried overnight at 110° C. in the atmosphere. As a result of XRD measurements, the dried product contained both an FAU-type crystal phase and an amorphous phase.

This comparative example is an example in which DAdIBr was used as an SDA and the $SiO_2/Al_2O_3$ and the $OH/SiO_2$ of the mixture were changed in the method disclosed in Non-Patent Document 3, but an AFX zeolite was not obtained.

Comparative Example 4

A mixture was prepared with the same method as in Comparative Example 2 with the exception that the mixture had the following composition. The composition of the mixture was as follows in terms of molar ratios.

$SiO_2/Al_2O_3=35.0$
$OH/SiO_2=0.25$
$Na/SiO_2=0.25$
$DAdIBr/SiO_2=0.05$
$H_2O/SiO_2=40$

The resulting mixture was sealed in a stainless steel autoclave and heated for 48 hours at 180° C. while rotating the autoclave to obtain a product.

The product was filtered, washed, and then dried overnight at 110° C. in the atmosphere. As a result of XRD measurements, the dried product was an FER-type crystal phase zeolite.

This comparative example is an example in which DAdIBr was used as an SDA and the $DAdI^+/SiO_2$ and the crystallization temperature of the mixture were changed in the method disclosed in Non-Patent Document 4, but an AFX zeolite was not obtained.

Comparative Example 5

A mixture was prepared with the same method as in Example 1 with the exception that the mixture had the following composition. The composition of the mixture was as follows in terms of molar ratios.

$SiO_2/Al_2O_3=27.5$
$OH/SiO_2=0.25$
$Na/SiO_2=0.25$
$DAdIBr/SiO_2=0.05$
$H_2O/SiO_2=40$

The resulting mixture was sealed in a stainless steel autoclave and heated for 48 hours at 180° C. while rotating the autoclave to obtain a product.

The product was filtered, washed, and then dried overnight at 110° C. in the atmosphere. As a result of XRD measurements, the dried product contained both an FER-type crystal phase and an amorphous phase.

This comparative example is an example in which the $OH/SiO_2$ and the $M/SiO_2$ ratio were changed in the method of Example 1, and is also an example in which DAdIBr was used as an SDA and the $SiO_2/Al_2O_3$, the crystallization temperature, the silicon source, and the aluminum source of the mixture were changed in the method disclosed in Non-Patent Document 4, but an AFX zeolite was not obtained.

Comparative Example 6

A mixture was prepared with the same method as in Example 1 with the exception that the mixture had the following composition. The composition of the mixture was as follows in terms of molar ratios.

$SiO_2/Al_2O_3=27.5$
$OH/SiO_2=0.20$
$Na/SiO_2=0.20$
$DAdIBr/SiO_2=0.05$
$H_2O/SiO_2=40$

The resulting reaction mixture was sealed in a stainless steel autoclave and heated for 192 hours (8 days) at 150° C. while rotating the autoclave to obtain a product.

The product was filtered, washed, and then dried overnight at 110° C. in the atmosphere. As a result of XRD measurements, the dried product was amorphous.

This comparative example is an example in which the $OH/SiO_2$, the $M/SiO_2$, the crystallization temperature, and the crystallization time were changed in the method of Example 1, and is also an example in which DAdIBr was used as an SDA and the $SiO_2/Al_2O_3$, the $OH/SiO_2$, the silicon source, and the aluminum source of the mixture were changed in the method disclosed in Non-Patent Document 4, but an AFX zeolite was not obtained.

Comparative Example 7

A mixture was prepared with the same method as in Example 1 with the exception that the mixture had the following composition. The composition of the mixture was as follows in terms of molar ratios.

$SiO_2/Al_2O_3=43.4$
$OH/SiO_2=0.15$
$Na/SiO_2=0.15$
$DAdIBr/SiO_2=0.05$
$H_2O/SiO_2=40$

The resulting reaction mixture was sealed in a stainless steel autoclave and heated for 93 hours at 150° C. while rotating the autoclave to obtain a product.

The product was filtered, washed, and then dried overnight at 110° C. in the atmosphere. As a result of XRD measurements, the dried product was amorphous.

This comparative example is an example in which the $SiO_2/Al_2O_3$, the crystallization temperature, and the crystallization time were changed in the method of Example 1, but an AFX zeolite was not obtained.

Comparative Example 8

A mixture was prepared with the same method as in Example 1 with the exception that the mixture had the following composition. The composition of the mixture was as follows in terms of molar ratios.

$SiO_2/Al_2O_3=19.8$
$OH/SiO_2=0.15$
$Na/SiO_2=0.15$
$DAdIBr/SiO_2=0.05$
$H_2O/SiO_2=40$

The resulting reaction mixture was sealed in a stainless steel autoclave and heated for 93 hours at 150° C. while rotating the autoclave to obtain a product.

The product was filtered, washed, and then dried overnight at 110° C. in the atmosphere. As a result of XRD measurements, the dried product was amorphous.

This comparative example is an example in which the $SiO_2/Al_2O_3$, the crystallization temperature, and the crystallization time were changed in the method of Example 1, but an AFX zeolite was not obtained.

Comparative Examples 7 and 8 are examples in which DAdIBr was used as an SDA and the $SiO_2/Al_2O_3$, the $OH/SiO_2$, the crystallization time, the silicon source, and the aluminum source of the mixture were changed in the method disclosed in Non-Patent Document 4, but an AFX zeolite was not obtained.

The above results are shown in the table below.

calcined for two hours at 600° C. in air. As a result of XRD measurements, it was confirmed that the product after calcination was an AFX zeolite having an $SiO_2/Al_2O_3$ of 32.6 and that the AFX zeolite had the lattice spacing d and the XRD peak intensity ratio according to the table below.

Figure 7:
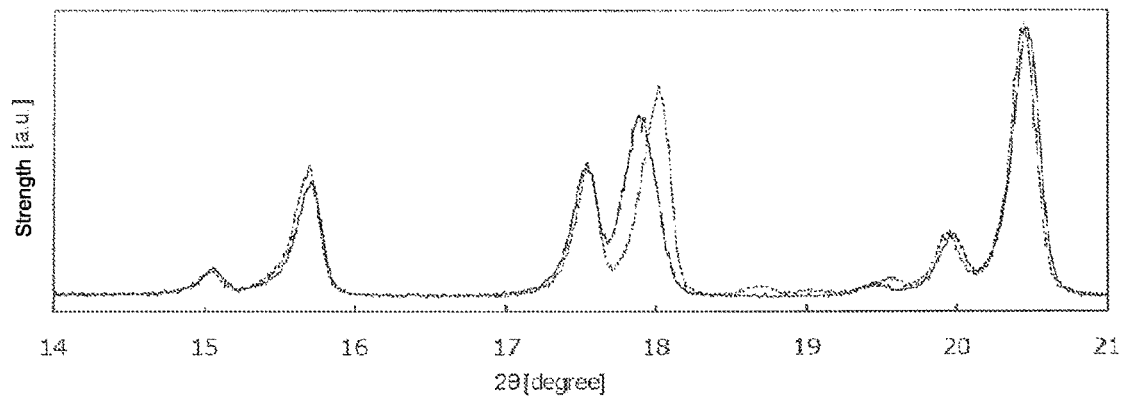
FIG. 7 illustrates XRD patterns of AFX zeolites obtained in Example 1 and Comparative Example 9 after calcination (solid line: Example 1, broken line: Comparative Example 9).

The results of a comparison of the XRD pattern of Comparative Example 9 with that of the calcined AFX zeolite obtained in Example 1 are shown in FIG. 7. Only the position of a peak in the vicinity of an XRD diffraction angle of 2θ=18°, which is associated with the 004 plane, differs between the two examples.

These zeolite particles had indeterminate shape. An SEM observation image of the crystal state is shown in FIG. 8.

TABLE 10

| | Composition of the mixture (raw material composition) | | | | | Crystallization temperature [° C.] | Crystallization time | Crystal phase | $SiO_2/Al_2O_3$ of the zeolite |
|---|---|---|---|---|---|---|---|---|---|
| | $SiO_2/Al_2O_3$ | $H_2O/SiO_2$ | $DAdI^+/SiO_2$ | $OH/SiO_2$ | $M/SiO_2$ | | | | |
| Example 1 | 27.5 | 40 | 0.05 | 0.15 | 0.15 | 180 | 48 h | AFX | 25.6 |
| Example 2 | 23.7 | 40 | 0.05 | 0.15 | 0.15 | 180 | 48 h | AFX | 23.2 |
| Example 3 | 19.8 | 40 | 0.05 | 0.15 | 0.15 | 180 | 48 h | AFX | 19.7 |
| Example 4 | 19.8 | 40 | 0.05 | 0.25 | 0.25 | 180 | 48 h | AFX | 16.9 |
| Example 5 | 15.8 | 40 | 0.05 | 0.2 | 0.2 | 180 | 48 h | AFX | 14.6 |
| Reference Example 1 | 43.4 | 40 | 0.05 | 0.12 | 0.12 | 180 | 48 h | AFX | 42.9 |
| Reference Example 2 | 43.4 | 40 | 0.05 | 0.15 | 0.15 | 180 | 48 h | AFX | 44.2 |
| Example 6 | 32.0 | 40 | 0.05 | 0.15 | 0.15 | 180 | 48 h | AFX | 29.9 |
| Example 7 | 19.8 | 40 | 0.05 | 0.2 | 0.2 | 180 | 48 h | AFX | 18.9 |
| Example 8 | 32.0 | 40 | 0.05 | 0.15 | 0.15 | 180 | 48 h | AFX | 30.6 |
| Example 9 | 34.0 | 40 | 0.05 | 0.15 | 0.15 | 180 | 48 h | AFX | 31.7 |
| Comparative Example 1 | 25.0 | 30 | 0.2 | 0.25 | 0.05 | 150 | 8 d | Am, FAU | |
| Comparative Example 2 | 35.0 | 30 | 0.1 | 0.25 | 0.25 | 150 | 8 d | Am | |
| Comparative Example 3 | 25.0 | 30 | 0.1 | 0.15 | 0.15 | 150 | 8 d | Am, FAU | |
| Comparative Example 4 | 35.0 | 40 | 0.05 | 0.25 | 0.25 | 180 | 48 h | FER | |
| Comparative Example 5 | 27.5 | 40 | 0.05 | 0.25 | 0.25 | 180 | 48 h | Am, FER | |
| Comparative Example 6 | 27.5 | 40 | 0.05 | 0.2 | 0.2 | 150 | 8 d | Am | |
| Comparative Example 7 | 43.4 | 40 | 0.05 | 0.15 | 0.15 | 150 | 93 h | Am | |
| Comparative Example 8 | 19.8 | 40 | 0.05 | 0.15 | 0.15 | 150 | 93 h | Am | |

* "Am" in the table means an amorphous phase

Comparative Example 9

An AFX zeolite was synthesized with the method described in Non-Patent Document 3. Prescribed amounts of water, DAdIOH, 48% NaOH, and Y-type zeolite (trade name: HSZ-320NAA, manufactured by Tosoh Corporation) were added to fumed silica (trade name: aerosil 300, manufactured by Nippon Aerosil) and thoroughly mixed while stirring. The composition of the mixture was as follows in terms of molar ratios.

$SiO_2/Al_2O_3$=35.7
$OH/SiO_2$=0.35
$Na/SiO_2$=0.10
$DAdIOH/SiO_2$=0.25
$H_2O/SiO_2$=30

The resulting reaction mixture was sealed in a stainless steel autoclave and heated for 288 hours at 150° C. while rotating the autoclave to obtain a product.

The product was filtered, washed, and then dried overnight at 110° C. in the atmosphere. The dried product was

TABLE 11

| Lattice spacing d [Å] | XRD peak intensity ratio |
|---|---|
| 11.75 | 24 |
| 10.11 | 100 |
| 7.55 | 87 |
| 6.80 | 72 |
| 4.92 | 40 |
| 4.34 | 51 |
| 4.05 | 52 |

Comparative Example 10

With reference to Non-Patent Document 1, 1,4-diazabicyclo[2.2.2]-octane-C4-diquat-dibromide (referred to as "DC4Br" hereafter) was synthesized. Specifically, 20.00 g of 1,4-diazabicyclo[2.2.2]-octane (reagent special grade) was dissolved in 19.77 g of methanol (reagent special grade), and the resulting solution was used as solution A.

Next, 12.83 g of 1,4-dibromobutane (reagent special grade) was added to 6.6 g of methanol, and the solution obtained after stirring for 15 minutes was used as solution B. Solution B was added dropwise into solution A while stirring on ice, and after the solution was added, the mixture was stirred for two hours to obtain a white precipitate. After 100 mL of diethyl ether was added to the white precipitate, it was filtered and washed with diethyl ether. After the washed white precipitate was air-dried, it was vacuum-dried at 50° C. until the weight reduction was eliminated so as to obtain DC4Br.

The synthesized DC4Br was dissolved in purified water to a concentration of 40 wt. % so as to prepare a 40% DC4Br aqueous solution.

Prescribed amounts of water, 40% DC4Br, 48% NaOH, and Y-type zeolite (trade name: HSZ-320NAA, manufactured by Tosoh Corporation) were added to No. 3 sodium silicate and thoroughly mixed while stirring. The composition of the mixture was as follows in terms of molar ratios.

$SiO_2/Al_2O_3 = 29.7$
$OH/SiO_2 = 0.80$
$Na/SiO_2 = 0.80$
$DC4Br/SiO_2 = 0.096$
$H_2O/SiO_2 = 28.4$

The resulting reaction mixture was sealed in a stainless steel autoclave and heated for 48 hours at 140° C. while rotating the autoclave to obtain a product.

The product was filtered, washed, and then dried overnight at 110° C. in the atmosphere. The dried product was calcined for two hours at 600° C. in air. As a result of XRD measurements, it was confirmed that the product after calcination was an AFX zeolite, but the zeolite had a lattice spacing d which differed from the lattice spacing d in Table 2. The $SiO_2/Al_2O_3$ of this zeolite was 8. The zeolite particles did not have a hexagonal bipyramids shape.

Synthesis of Copper-Containing AFX Zeolite

Example 2-1

The copper content was added by an incipient wetness impregnation method. A copper nitrate solution was prepared by dissolving 1.08 g of copper nitrate trihydrate in 3.1 g of purified water. The copper nitrate solution was added dropwise to 9 g of the $NH_4$ type AFX zeolite obtained in Example 1, mixed for five minutes with a mortar, and further dried overnight at 110° C. The dried zeolite was calcined for two hours at 550° C. in air.

The calcined zeolite had a copper content of 3.2 wt. % and a Cu/Al of 0.43.

As a result of XRD measurements, it was confirmed that the zeolite after calcination had the lattice spacing d and the XRD peak intensity ratio according to the table below.

TABLE 12

| Lattice spacing d [Å] | XRD peak intensity ratio |
|---|---|
| 11.79 | 10 |
| 10.14 | 56 |
| 7.59 | 100 |
| 6.81 | 62 |
| 4.95 | 31 |
| 4.34 | 58 |
| 4.06 | 58 |

The $d_{(004)}$ value was 4.95 Å, and it was confirmed that even a copper-bearing an AFX zeolite has approximately the same c-axis length as the c-axis length of the AFX zeolite of the present invention.

Example 2-2

The AFX zeolite of Example 3 was ion-exchanged using a 20% ammonium chloride aqueous solution to form an $NH_4$ type AFX zeolite. Copper was added with the same method as in Example 2-1 with the exception that this $NH_4$ type AFX zeolite was used. The calcined zeolite had a copper content of 3.0 wt. % and a Cu/Al of 0.29.

Example 2-3

The AFX zeolite of Example 5 was ion-exchanged using a 20% ammonium chloride aqueous solution to form an $NH_4$ type AFX zeolite. Copper was added with the same method as in Example 2-1 with the exception that this $NH_4$ type AFX zeolite was used. The calcined zeolite had a copper content of 3.0 wt. % and a Cu/Al of 0.24.

Example 2-4

The AFX zeolite of Example 6 was ion-exchanged using a 20% ammonium chloride aqueous solution to form an $NH_4$ type AFX zeolite. Copper was added with the same method as in Example 2-1 with the exception that this $NH_4$ type AFX zeolite was used. The calcined zeolite had a copper content of 2.9 wt. % and a Cu/Al of 0.45.

Comparative Example 2-1

The AFX zeolite of Comparative Example 10 was ion-exchanged using a 20% ammonium chloride aqueous solution to form an $NH_4$ type AFX zeolite. Copper was added with the same method as in Example 2-1 with the exception that this $NH_4$ type AFX zeolite was used. The calcined zeolite had a copper content of 3.0 wt. % and a Cu/Al of 0.15.

Evaluation of Hydrothermal Durability Treatment and SCR Catalyst Activity

Measurement Example 1 (SCR Catalyst Activity in a Fresh State)

The SCR catalyst activity was evaluated without performing hydrothermal durability treatment for the zeolites obtained in Examples 2-1 to 2-4. The evaluation results for the nitrogen oxide reduction rate are shown in Table 13.

Comparative Measurement Example 1 (SCR Catalyst Activity in a Fresh State)

The SCR catalyst activity was evaluated without performing hydrothermal durability treatment for the zeolite obtained in Comparative Example 2-1. The resulting nitrogen oxide reduction rate is shown in Table 13.

TABLE 13

| | SCR reaction temperature [° C.] | | | | |
|---|---|---|---|---|---|
| | 150 | 200 | 300 | 400 | 500 |
| Example 2-1 | 65 | 87 | 96 | 91 | 70 |
| Example 2-2 | 67 | 90 | 98 | 95 | 85 |
| Example 2-3 | 68 | 89 | 97 | 96 | 91 |
| Example 2-4 | 61 | 87 | 97 | 91 | 66 |
| Comparative Example 2-1 | 61 | 88 | 97 | 98 | 99 |

* The values in the table are the nitrogen oxide reduction rates

Measurement Example 2 (SCR Catalyst Activity after Hydrothermal Durability Treatment)

Hydrothermal durability treatment was performed as follows on the zeolite obtained in Example 2-1. An atmospheric-pressure fixed-bed flow reactor was filled with 3 mL of the zeolite as a pellet for catalyst evaluation, and heat treatment was performed for one hour at 900° C. under flowing air containing 10 vol. % of $H_2O$. Treatment was performed at a treatment gas flow rate of 0.3 L/min and a spatial velocity (SV) of 6000 $h^{-1}$. The SCR catalyst activity was evaluated for the zeolite after hydrothermal durability treatment. The resulting nitrogen oxide reduction rate is shown in Table 14.

Comparative Measurement Example 2 (SCR Catalyst Activity after Hydrothermal Durability Treatment)

Hydrothermal durability treatment was performed on the zeolite obtained in Comparative Example 2-1 under the same conditions as in Measurement Example 2.

The SCR catalyst activity was evaluated for the zeolite after hydrothermal durability treatment. The resulting nitrogen oxide reduction rate is shown in Table 14.

TABLE 14

| | SCR reaction temperature [° C.] | | | | |
|---|---|---|---|---|---|
| | 150 | 200 | 300 | 400 | 500 |
| Example 2-1 | 66 | 90 | 95 | 88 | 68 |
| Comparative Example 2-1 | 3 | 4 | 8 | 10 | 17 |

* The values in the table are the nitrogen oxide reduction rates

It can be confirmed from the above table that the nitrogen oxide reduction rates at 150° C. and 200° C. prior to hydrothermal durability treatment are 67% and 87% in Example 2-1 and 61% and 88% in Comparative Example 2-1, and both examples yielded high values. In contrast, the nitrogen oxide reduction rate of Example 9 after one hour of hydrothermal durability treatment was at approximately the same level as that prior to hydrothermal durability treatment. On the other hand, the crystal structure of the zeolite of Comparative Example 2-1 collapsed due to one hour of hydrothermal durability treatment at 900° C., and it was confirmed that the activity was dramatically diminished.

Measurement Example 3 (SCR Catalyst Activity after Hydrothermal Durability Treatment)

Hydrothermal durability treatment was performed on the zeolite obtained in Comparative Example 2-1-2-4 under the same conditions as in Measurement Example 2 with the exception that the time was set to four hours. The SCR catalyst activity was evaluated for the zeolite after hydrothermal durability treatment. The resulting nitrogen oxide reduction rate is shown in the table below.

TABLE 15

| | SCR reaction temperature [° C.] | | | | |
|---|---|---|---|---|---|
| | 150 | 200 | 300 | 400 | 500 |
| Example 2-1 | 64 | 89 | 95 | 87 | 60 |
| Example 2-2 | 62 | 92 | 98 | 93 | 79 |
| Example 2-3 | 51 | 94 | 100 | 99 | 81 |
| Example 2-4 | 61 | 92 | 99 | 91 | 57 |

* The values in the table are the nitrogen oxide reduction rates

It was confirmed from Table 15 that the AFX zeolite of the present invention exhibits good nitrogen oxide reduction characteristics. Specifically, it was confirmed that since the AFX zeolite of the present invention has very high heat resistance, there is practically no decrease in activity even after four hours of hydrothermal durability treatment at 900° C., and that the AFX zeolite has high nitrogen oxide reduction characteristics over a broad temperature range even after hydrothermal durability treatment.

Comparative Example 3-1

The AFX zeolite obtained in Comparative Example 9 was ion-exchanged using a 20% ammonium chloride aqueous solution to form an $NH_4$ type AFX zeolite.

Measurement Example 4 (Hot Water Resistance Evaluation)

Hot water resistance was evaluated by comparing the crystallinity before and after hydrothermal durability treatment. Hydrothermal durability treatment was performed on the zeolite obtained in Example 1 and the zeolite obtained in Comparative Example 3-1 under the same conditions as in Measurement Example 2 with the exception that the time was set to four hours. XRD measurements were performed on the sample before and after hydrothermal treatment, and the peak area of an XRD peak corresponding to $d_{(004)}$ was measured. The ratio of the peak area after hydrothermal durability treatment to the peak area before hydrothermal durability treatment was determined, and this was used as the peak area residual rate. The results are shown in the table below.

TABLE 16

| | Peak area residual rate (%) | |
|---|---|---|
| | Before hydrothermal durability treatment | After hydrothermal durability treatment |
| Example 1 | 100 | 84 |
| Comparative Example 3-1 | 100 | 71 |

It was confirmed from Table 16 that the AFX zeolite of the present invention has high high-temperature hydrothermal durability. In particular, it was confirmed that although the zeolite of Example 1 has a lower $SiO_2/Al_2O_3$ than the zeolite of Comparative Example 3-1, it exhibits higher hot water resistance, and it was thus confirmed that the AFX zeolite of the present invention has particularly excellent high-temperature hydrothermal durability.

INDUSTRIAL APPLICABILITY

The AFX zeolite of the present invention can be used as an adsorbent or a catalyst incorporated into an exhaust gas treatment system, for example, and can be used, in particular, as an SCR catalyst for removing nitrogen oxides in exhaust gas of automobiles, diesel automobiles, in particular, in the presence of a reducer, and further as an SCR catalyst formed integrally with a DPF.

All of the content of the specification, scope of patent claims, abstract, and drawings of Japanese Patent Application No. 2015-020805 filed on Feb. 5, 2015 is cited here and incorporated as a disclosure of the specification of the present invention.

The invention claimed is:

1. An AFX zeolite having a lattice spacing d of a (004) plane being not less than 4.84 Å and not greater than 5.00 Å, and a molar ratio of silica to alumina being not less than 10 and not higher than 32.

2. The AFX zeolite according to claim 1, wherein the lattice spacing d of the (004) plane is not less than 4.925 Å and not greater than 5.00 Å.

3. The AFX zeolite according to claim 1, wherein the molar ratio of silica to alumina is not less than 10 and not greater than 30.

4. The AFX zeolite according to claim 1 having a lattice spacing d according to the following table:

TABLE 1

| Lattice spacing d [Å] |
|---|
| 11.81 ± 0.13 |
| 10.13 ± 0.08 |
| 7.59 ± 0.08 |
| 6.80 ± 0.06 |
| 4.96 ± 0.035 |
| 4.34 ± 0.02 |
| 4.06 ± 0.02 |

5. The AFX zeolite according to claim 1 containing primary particles having a hexagonal bipyramids shape.

6. The AFX zeolite according to claim 1 containing crystal particles including primary particles aggregated by chemical bonds.

7. The AFX zeolite according to claim 1 containing one or more types of transition metals selected from the group consisting of groups 8, 9, 10, and 11 of the periodic table.

8. A production method for the AFX zeolite according to claim 1, the method comprising a crystallization step of crystallizing a composition at a temperature of not lower than 160° C.; the composition containing a silicon source, an aluminum source, a 1,3-di(1-adamantyl)imidazolium cation, and an alkali metal; a molar ratio of hydroxide ions to silica being less than 0.25 or a molar ratio of silica to alumina being not higher than 27; and a molar ratio of the 1,3-di(1-adamantyl)imidazolium cation to silica being less than 0.20.

9. The production method according to claim 8, wherein the composition contains at least one type selected from the group consisting of 1,3-di(1-adamantyl)imidazolium hydroxide, 1,3-di(1-adamantyl)imidazolium bromide, 1,3-di(1-adamantyl)imidazolium chloride, and 1,3-di(1-adamantyl)imidazolium iodide.

10. The production method according to claim 8, wherein the composition has the following composition:
   $SiO_2/Al_2O_3$ of not less than 10 and less than 100;
   $OH/SiO_2$ of not less than 0.06 and less than 0.25;
   Alkali metal/$SiO_2$ of not less than 0.06 and less than 0.25;
   1,3-Di(1-adamantyl)imidazolium cation/$SiO_2$ of not less than 0.02 and less than 0.20; and
   $H_2O/SiO_2$ of not less than 5 and less than 60.

11. The production method according to claim 8, wherein the composition has the following composition:
   $SiO_2/Al_2O_3$ of not less than 10 and not higher than 25;
   $OH/SiO_2$ of not less than 0.25 and less than 0.40;
   Alkali metal/$SiO_2$ of not less than 0.25 and less than 0.40;
   1,3-Di(1-adamantyl)imidazolium cation/$SiO_2$ of not less than 0.02 and less than 0.20; and
   $H_2O/SiO_2$ ratio of not less than 5 and less than 60.

12. A catalyst containing the AFX zeolite according to claim 1.

13. A reduction and removal method for nitrogen oxides comprising contacting a gas containing a nitrogen oxide with the AFX zeolite according to claim 1.

* * * * *